United States Patent Office 3,434,394
Patented Mar. 25, 1969

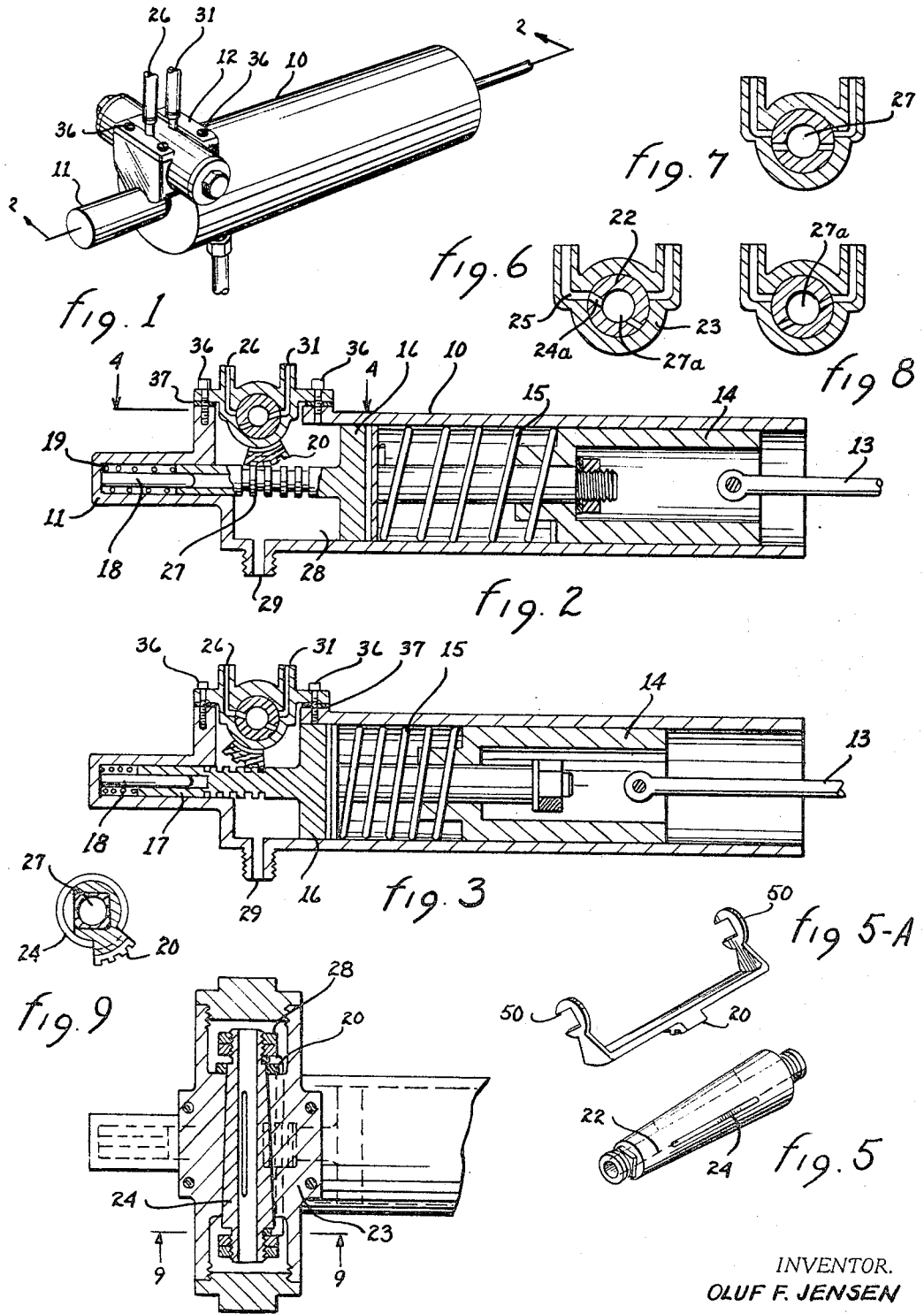

3,434,394
POWER BRAKES FOR AUTOMOTIVE VEHICLES
Oluf Fred Jensen, Rte. 2, Box 462,
Apache Junction, Ariz. 85220
Filed Oct. 10, 1966, Ser. No. 585,594
Int. Cl. F15b 7/08
U.S. Cl. 91—470   4 Claims

ABSTRACT OF THE DISCLOSURE

A power braking system having a control valve arranged to make use of the source of fluid pressure from the power steering apparatus of a motor vehicle to operate the power brakes.

---

This invention relates to new and useful improvements in power brakes for automotive vehicles and the like.

As is known, the source of power to operate power brakes is furnished by low pressure from the engine intake manifold. This low pressure, also referred to as vacuum, is generated when the engine is running; it is usually stored in a reserve low pressure or vacuum tank.

The conventional power brake systems now in use require a great number of component parts, are cumbersome in their installation, and complicated in their operation.

It is an object of this invention to provide a simple, compact power brake mechanism for mobile vehicles by making use of the pressuritzed power-steering fluid to operate the power brakes.

It is a further object of this invention to provide an improved mechanism which will be simple and inexpensive to manufacture, easy to install, maintain and repair, and rugged and durable in use.

To accomplish these and other objects of the invention, there is provided a brake system comprising a three-position fluid control valve with application, holding and release positions. This is done for example, by hollowing the rotor of a tapered rotary cutout valve and placing a port on each longitudinal side of same. To get maximum capacity with a minimum of rotation, these ports are long and narrow with upper edges clean cut and parallel with the longitudinal center line of the valve but slightly below this line.

The ports of the valve bushing are of the same dimension, with the lower edge also in line with the center line of the rotor but slightly above to permit lap or overlap position.

Other objects and advantages of the present invention will become apparent from a consideration of the following description, taken in connection with the accompanying drawings, in which:

FIG. 1 is a schematic view in perspective of one embodiment of the present invention.

FIGS. 2 and 3 are cross-sectional views of a mechanism according to this invention.

FIG. 4 is a substantially cross-sectional view along line 4—4 of FIG. 2.

FIG. 5 shows the valve rotor and the yoke mechanism to rotate the valve.

FIGS. 6–9 show various details of the construction and operation of the valve mechanism.

Referring now to the drawings, the device of the preferred embodiment of this invention accordingly comprises a master cylinder 10, with cylinder head 11, and a three position, rotary type valve assembly 12, removably mounted upon the cylinder 10. Piston 16 is actuated from a foot controlled lever 13 by the operator of the vehicle. When lever 13 is depressed, it forces guide 14 along the inner face of the master cylinder 10 which in turn compresses the main spring 15, thus forcing piston 16 inward as shown in FIG. 3. The floating piston 16 is held in alignment by piston rod 17 which extends into guide channel 18 in cylinder head 11, and is counter-balanced by the light spring 19. As the piston head moves inward, gears 27 and 20 (FIG. 2) engage, and thus rotate since gear 20 is integral, through yoke number 50, with the rotor 22 of the valve, number 22 is rotated within valve housing 23. This movement aligns rotor port 24 and bushing port 25. At this point hydraulic fluid under pressure from the power steering mechanism enters through hose connection 31 and through ports 24a and 25 into hollow center 27a of the valve rotor 24, out the ends of port 29 leading to the brake cylinders or other braking mechanisms, thus affording an efficient braking action.

When sufficient foot pressure builds up on the guide and piston system 14–16 to overcome the tension of main spring 15, piston head 16 closes admission ports 24a and 25, leaving the valve in overlap, holding or inert position as shown in FIG. 7. By increasing the foot pressure there is obtained a higher pressure buildup in the chamber 28 and in the brake cylinders, thus causing further braking action.

Removing foot pedal pressure releases the tension on main spring 15, thus permitting fluid pressure and spring 19 to force the piston head 16 back to the original position as shown in FIG. 2. At this point the hydraulic fluid leaves chamber 28 through valve rotor port 24a and valve bushing port 25. The hydraulic fluid is then exhausted through outlet hose 31 and the braking cycle is thus completed.

An important feature of this invention is the removability of the valve system from the remainder of the mechanism. A preferred method of accomplishing this is shown schematically in FIGURES 1 and 2 which show a plurality of studs 36 adapted to mount and dismount the entire valve mechanism in a simple and rapid manner. Means such as a gasket 37 are provided to assure that the brake fluid is retained in place when the system is under pressure.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:
1. A power brake system for a motor vehicle comprising in combination:
   (A) a master cylinder having a manually actuated lever for moving a piston therein,
   (B) a control valve having an actuable control member connected to the piston,
   (C) yielding means interconnected between the piston and the manually actuable lever operable by the manual movement of the piston to operate the control member to a plurality of control positions,
   (D) a power source of fluid pressure,

(E) a fluid pressure chamber connected to the piston of the master cylinder and to the wheel braking mechanism of the vehicle so that manual braking pressure may be directly applied to the vehicle brakes, and (F) means connecting the power source of fluid pressure through the control valve to the fluid pressure chamber so that when sufficient manual pressure is applied to the piston to overcome the yielding means the control valve will be actuated to apply the power source of fluid pressure to the pressure chamber to increase fluid braking pressure to the wheel brakes of the vehicle.

2. A power brake system as in claim 1 wherein the source of fluid pressure is derived from the power steering fluid pressure system of the vehicle.

3. A power brake system as in claim 1 wherein the plurality of control positions of the actuable control member for the control valve includes first a position of disconnection, a second position of connection, and a third of exhaust discharge of the power source of fluid pressure relative to the fluid pressure chamber in response to the degree of pressure manually applied to the piston.

4. A power brake system as set forth in claim 1 wherein the control valve comprises a three-position tapered rotary valve removably mounted on the cylinder and having its actuable rotary control element moved by a rack and gear segment from the actuation of the manually actuated piston.

References Cited

UNITED STATES PATENTS

| | | |
|---|---|---|
| 1,890,010 | 12/1932 | Vickers. |
| 2,624,361 | 1/1953 | Brown. |
| 2,848,877 | 8/1958 | Stelzer. |
| 2,866,317 | 12/1958 | Stelzer. |
| 2,964,909 | 12/1960 | Garrison. |
| 3,021,869 | 2/1962 | Ross _____ 137—625.47 XR |
| 3,050,944 | 8/1962 | Schwartz et al. |
| 3,165,122 | 1/1965 | Sachnik _____ 137—625.47 |
| 3,222,867 | 12/1965 | Gauldie. |

MARTIN P. SCHWADRON, *Primary Examiner.*

ROBERT R. BUNEVICH, *Assistant Examiner.*

U.S. Cl. X.R.

60—52, 54.5; 137—625.47